Figure 1:
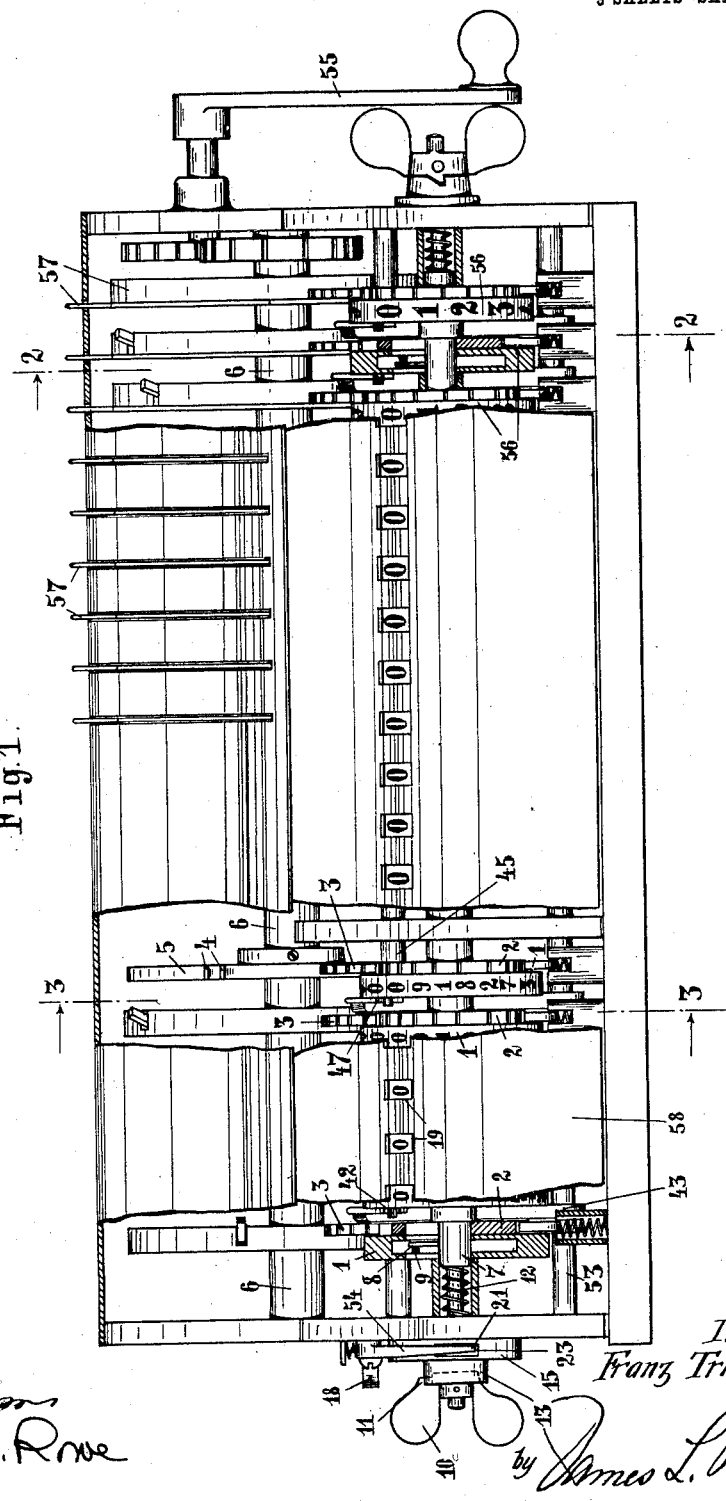

F. TRINKS.
CALCULATING MACHINE.
APPLICATION FILED OCT. 11, 1913.

1,088,486.

Patented Feb. 24, 1914.
3 SHEETS—SHEET 1.

Witnesses

Inventor
Franz Trinks,
by James L. Norris
Attorney.

F. TRINKS.
CALCULATING MACHINE.
APPLICATION FILED OCT. 11, 1913.
1,088,486.
Patented Feb. 24, 1914.
3 SHEETS—SHEET 2.
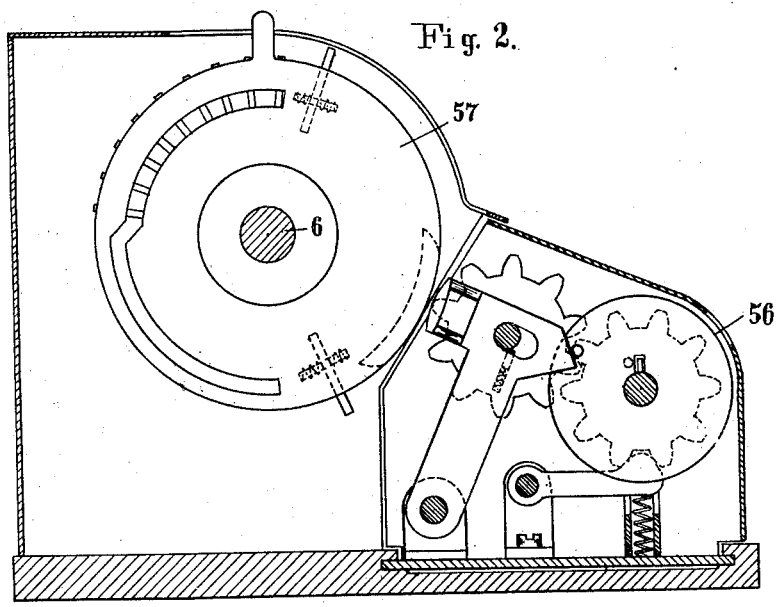
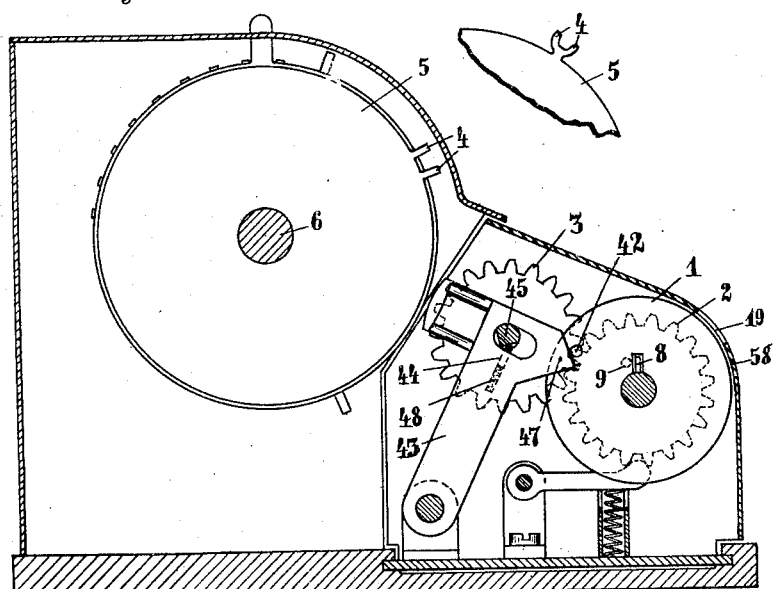
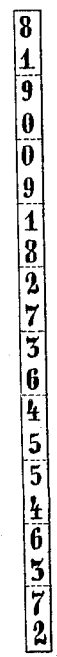
Witnesses
Inventor
Franz Trinks
by James L. Norris,
Attorney.

F. TRINKS.
CALCULATING MACHINE.
APPLICATION FILED OCT. 11, 1913.
1,088,486.
Patented Feb. 24, 1914.
3 SHEETS—SHEET 3.
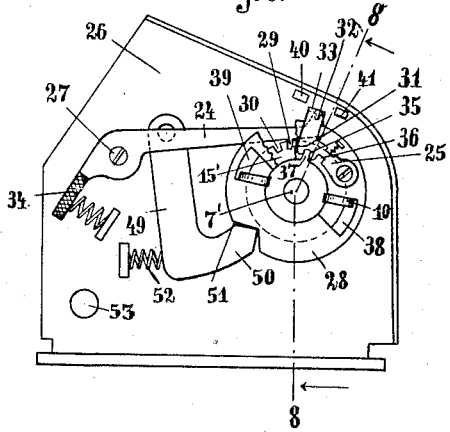
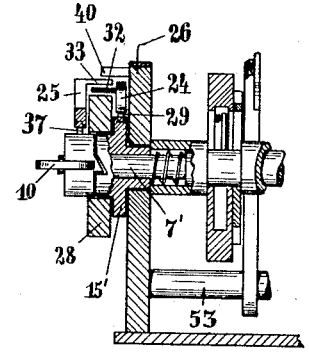
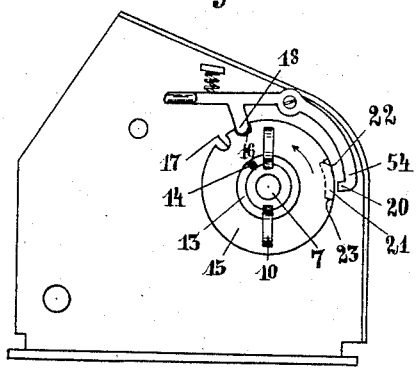
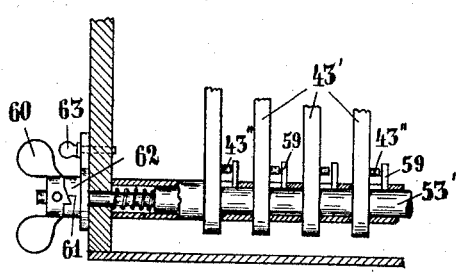
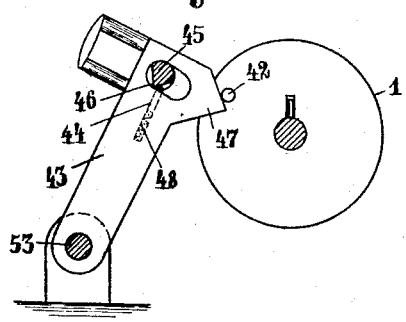
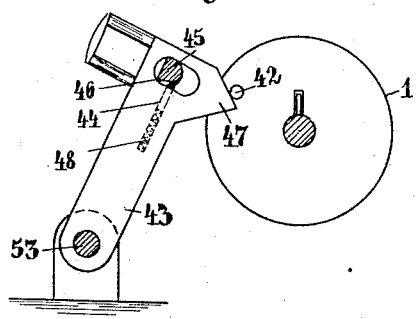
Witnesses
Inventor
Franz Trinks
by
James L. Norris.
Attorney.

UNITED STATES PATENT OFFICE.

FRANZ TRINKS, OF BRUNSWICK, GERMANY.

CALCULATING-MACHINE.

1,088,486.      Specification of Letters Patent.      Patented Feb. 24, 1914.

Application filed October 11, 1913. Serial No. 794,721.

*To all whom it may concern:*

Be it known that I, FRANZ TRINKS, manufacturer, citizen of the Duchy of Brunswick, Empire of Germany, residing at Brunswick, Germany, have invented certain new and useful Improvements in Calculating-Machines, of which the following is a specification.

My invention relates to improvements in calculating machines, and more particularly in calculating machines of the class in which the numeral wheels of a revolutions counting mechanism are each provided with two series of numbers displaced from each other, and in which this revolutions counting mechanism is equipped with resetting devices by means of which all the numeral wheels can be reset to different initial positions.

The object of the improvements is to provide a machine of this class in which a single resetting mechanism is provided which is adapted to return all the values displayed through the peep holes of the machine casing into their respective zero positions, and by means of which the whole mechanism can be set from any zero or value indicating position to a definite number which is to be used as an initial number from which the calculation is to be started.

With this object in view my invention consists in so constructing the resetting mechanism, that it can be set and fixed in several initial positions.

For the purpose of explaining the invention several embodiments thereof have been shown in the accompanying drawings, in which° the same letters of reference have been used in all the views to indicate corresponding parts.

In said drawings—Figure 1, is a front view of a calculating machine with the cover of the casing partly removed and partly in section, Fig. 2, is a cross-section taken on the line 2—2 of Fig. 1, Fig. 3, is a cross-section taken on the line 3—3 of Fig. 1, Fig. 4, is an end view of the carriage carrying the numeral wheels, Fig. 5, is a development of one of the numeral wheels of the machine shown in Figs. 1 to 4, Fig. 6, is a detail view showing a modification of a part of Figs. 1 and 3, Fig. 7, is an end view of a carriage of the registering mechanism of a modification of the calculating machine, Fig. 8, is a partial section of Fig. 7 taken on the line 8—8, Fig. 9, shows a carrying lever of the machine shown in Figs. 1 and 3 and a subsidiary shaft and its bearings provided for rocking the said lever from the end position shown in the figure into its other end position, Fig. 10, is a similar view of the said lever showing the shaft in a different position, and Fig. 11, is a detail view illustrating a further modification.

For the purpose of explaining the invention I shall describe a calculating machine which is equipped with a setting mechanism adapted to be rotated by means of a machine crank and consisting of setting disks each of which is provided with a plurality of teeth which are adapted to be shifted into or out of operative positions by means of rotary cam disks, the said setting disks being adapted to transmit the values set thereon through transmission wheels to a main registering mechanism which is mounted on a shiftable carriage. Coaxially of the said registering mechanism a revolutions counting mechanism is provided which is adapted to register the number of the revolutions of the machine crank. A calculating machine of this class is shown for example in the patent of the United States No. 1,040,059, granted to me October 1, 1912. I wish it to be understood, that this particular calculating machine has been shown merely for the purpose of explaining the invention, and that my invention is not limited to the use in combination with the class of calculating machine shown in the drawings. Also in other respects it will be understood, that various changes may be made in the general arrangement and construction of the parts of the machine within the gist of my invention.

Referring now more particularly to the example illustrated in Figs. 1 to 5 of the drawings, the calculating machine consists of a setting mechanism 57 which is adapted to be operated by means of a machine crank 55 and to transmit the values set thereon to a main registering mechanism 56. Furthermore the machine is provided with a revolutions counting mechanism the numeral wheels 1 of which have two series of numbers printed thereon, which numbers are displaced from each other, the arrangement of the said series of numbers being illustrated in Fig. 5 showing a development of one of the numeral wheels. Each of the numeral wheels 1 is connected with a spur gear 2 having twenty teeth and meshing with an intermediate gear wheel 3. The said gear wheels are adapted to be operated from a driving gear wheel 5 which is equipped with two teeth 4 and is secured to the shaft 6 of the setting mechanism 57. The teeth 4 may also be combined into a single one, as is shown in Fig. 6. For resetting the numeral wheels 1 a shaft 7 is provided which carries a number of teeth 8 which are adapted by longitudinal displacement of the shaft to be brought into position for engagement with noses 9 of the numeral wheels 1 and to carry the same along upon rotation of the shaft. Rotary movement is imparted to the shaft 7 by means of a wing nut 10 a nose 11 of which is held in engagement with a cam face formed on a sleeve 13 by a spring 12. When the wing nut 10 is turned the nose 11 rides on the cam face 14, so that the shaft 7 is shifted in the direction of its axis, and the noses 9 are engaged by the pins 8.

In the embodiment of the invention shown in Figs. 1 to 5 a disk 15 is connected with the sleeve 13, and the said disk is formed with two adjacent notches 16 and 17 which are at a distance from each other equal to one twentieth of the circumference of the disk and are adapted to be engaged by a spring actuated pawl 18 which is adapted to be lifted out of engagement with the notches by hand. In the position shown in Fig. 4 the notch 16 is provided for the series of numbers corresponding to divisions and subtractions, and the notch 17 is provided for the series of numbers corresponding to additions and multiplications. If the result of a division has been displayed through the peep holes 19 of the cover of the casing 58, and it is desired to reset the mechanism, the wing nut 10 is turned in the direction of the arrow shown in Fig. 4.

If it is desired to begin a multiplication, the zeros of the series of the numbers corresponding to the multiplication must at first be brought into the positions in which they are displayed through the peep holes 19. For this purpose the pawl 18 is at first disengaged from its notch, and the disk 15 is turned until the pawl 18 can engage in the notch 17. The values which thus appear can easily be erased by turning the wing nut and thus resetting the mechanism. If it is desired thereafter to again perform subtractions or divisions, the disk 15 is again returned into the position shown in the figure.

In order to prevent the disk 15 from getting into a wrong position when being turned, the pawl 18 is formed with a rearwardly extending arm 54 which engages with a nose 20 into a longitudinal notch 21 of the disk 15 when the pawl 18 is being lifted. In this case the end faces 22, 23 of the said notch prevent the disk 15 from being rotated beyond the notches 16 and 17.

In the example shown in Figs. 7 and 8 instead of the single pawl 18 shown in Fig. 4 two separate pawls 24 and 25 are provided, the pawl 24 having its fulcrum 27 on the side wall 26 of the carriage, and the pawl 25 having a rocking support on a disk 28 which takes part in the movement of the wing nut 10 being turned. The pawl 24 is equipped with a nose 29 by means of which it is adapted to engage in either one of two notches 30 and 31 belonging each to one series of numbers and formed in the disk 15', so as to prevent rotation of the latter, when the pawl is in engagement with one of the notches. Besides the pawl is formed with a laterally projecting finger 32 which engages below a lateral projection 33 of the pawl 25 and lifts the same when a button 34 on the end of the pawl 24 is being depressed. Normally it does not engage the projection 33, so that the pawl 25 can take part in the rotation of the disk 28. The pawl 25 is formed with two notches 35 and 36 corresponding to the two series of numbers and arranged to lock the wing nut 10 by means of a finger 37 provided on the latter. The wing nut is free to be turned with its wing in notches 38 and 39 of the disk 28 without carrying the same along. The disk is carried along only through the intermediary of the pawl 25 which has a rocking support on the disk 28 and which is coupled to the wing nut 10 when the finger 37 engages in one of the notches 35 or 36 of the pawl 25.

The disk 28 can be prevented from being rotated while the wing nut 10 is being operated and after the pawls 24 and 25 have been disengaged from their notches. For this purpose above the pawl 25 two stop members 40 and 41 are fixed to the side wall 26 of the carriage, which stop members are so arranged, that the finger 33 gets into position between the same when the pawl is being rocked upward, so that rocking movement of the pawl 25 and thereby rotation of the disk 28 are prevented.

In the machine shown in the figures the carrying mechanism consists of rocking arms 43 constructed in the form of hammers and adapted to be rocked by pins 42 secured to the numeral wheels, as is known in machines of this type. Each of the hammers 43 is formed at its upper end with a slot through which a shaft 45 carrying the intermediary transmission wheels 3 is passed. Furthermore each of the hammers is equipped with a plunger 44 acted upon by a spring 48 and arranged for engagement with the shaft 45. This mechanism is provided for locking the hammers 43 in either one of their end positions, as is known in the art.

When passing from one series of numbers to the other one the pins 42 must be brought from the upper to the lower side of the head 47 of the carrying arm or hammer 43, or vice versa. This can be effected by first rocking the arm 43 away from the said pin, moving the pin 42 with the numeral wheel 1 downward and then returning the lever 43 into its position of rest. To effect this and to compress in this operation the spring 48 of the hammer 43 as little as possible the shaft 45 has a rocking support, Fig. 9, which shows one of the hammers 43 illustrates the known function of the spring actuated locking plunger 44. As shown the shaft 45 is formed with edges at the points where it is engaged by the plungers 44. In the position shown in Fig. 10 the shaft 45 has been rocked in such a way, that the edges of the shaft are directed to the left. Therefore the plunger 44 can not engage at the rear of the edge 46, and after the pin 42 has passed the head 47 of the hammer 43 the corresponding plunger 44 is forced by its spring 48 against one of the beveled surfaces of the edge of the shaft which assumes an inclined position when the shaft 45 is turned, so that also the hammer 43 is returned into operative position.

The shaft 45 is turned from the resetting mechanism 7 of the revolutions counting mechanism by means of a crank 49, a nose 50 of the said crank being forced out of a notch 51 when the disk 28 is being rotated. At the end of the rotation of the disk 28 a spring 52 forces the nose 50 back into engagement with its notch.

The second embodiment of my invention is preferable as compared to the first one, because in each position of the wing nut 10 the shaft 45 is rocked with equal accuracy, without having dead movement which in the example shown in Figs. 1 and 4 can not be avoided, if the disk is to be used as a controlling disk for the shaft 45.

For shifting the carrying pin 42 from the lower to the upper side of the head 47 of the hammer 43, the said hammer 43 may if desired be so connected with the resetting mechanism, or more particularly with the wing nut 10 of the resetting shaft 7, that by starting the operation of the resetting mechanism the hammers 43 are rocked. Before making use of the rocking movement the hammers 43 must be rocked backward by suitable stop members. This may be done for example by means of a shaft 53 common to all the levers 43, which is constructed in the same way as a resetting shaft equipped with resetting pins, as has been indicated in Fig. 11. As shown the axis 53' of the carrying levers 43' is equipped with pins 59, and it is provided at its left hand end with a wing nut 60 which is adapted to longitudinally shift and turn the said shaft. When the axis 53' is shifted the pins 59 move into position for engagement with pins 43'' secured to the levers 43' and carry the same along during rotation of the shaft. If the sleeve 62 which is engaged by a cam face 61 formed on the wing nut is so constructed that it can be turned and locked by means of a locking pin 63 or the like in several positions, the levers 43' can be turned in both directions by means of the wing nut 60.

It will be understood, that the construction shown in Fig. 11 may also be embodied in the previously described figures, and that it has been shown in a separate figure merely for clearness sake.

By reason of the large number of values of the revolutions counting mechanism much power is required for rocking the hammers. Therefore I prefer to shift the carrying pin from the upper to the lower side of the head of the hammer by rotating the same in the opposite direction at an angle of nearly 360 degrees, which may be done by rotating the numeral wheel 1. If this is to be done from the resetting shaft 7, all that is necessary is to turn the resetting shaft backward until its pins get in engagement at the rear of the stops provided on the numeral wheels when the resetting shaft is pulled outward in axial direction. Thereupon, by a complete rotation the numeral wheels are carried along, so that the zero belonging to the other series of numbers is displayed. In this case a resetting shaft of the construction shown in Fig. 5 of the German Patent 197,453 may advantageously be used after slightly modifying the same.

I claim herein as my invention:

1. In a calculating machine, the combination with the revolutions counting mechanism, comprising numeral wheels having two series of numbers displaced from each other, of resetting mechanism having a plurality of end or zero positions, and means to set the resetting mechanism for operation with either one of its end or zero positions.

2. In a calculating machine, the combination with the revolutions counting mechanism, comprising numeral wheels having two series of numbers displaced from each other, of resetting mechanism having a plurality of end or zero positions, a movable member coöperating with the resetting mechanism and providing a plurality of end positions therefor, and means to set said movable member in either one of its end positions.

3. In a calculating machine, the combination with the revolutions counting mechanism, comprising numeral wheels having two series of numbers displaced from each other, of resetting mechanism having a plurality of end or zero positions and comprising a rotary resetting shaft, a sleeve on said shaft providing an end or zero position therefor, and means to set said sleeve in different positions.

4. In a calculating machine, the combination with the revolutions counting mechanism, comprising numeral wheels having two series of numbers displaced from each other of resetting mechanism having a plurality of end or zero positions and comprising a rotary resetting shaft, a sleeve on said shaft providing an end or zero position therefor, and a locking pawl adapted to lock said sleeve in different zero or end positions.

5. In a calculating machine, the combination with the revolutions counting mechanism, comprising numeral wheels having two series of numbers displaced from each other, of resetting mechanism having a plurality of end or zero positions and comprising a rotary resetting shaft, a sleeve on said shaft providing an end or zero position therefor, a locking pawl adapted to lock said sleeve in different zero or end positions, and means operative when the pawl is in non-locking position to prevent said sleeve from movement away from its positions for locking engagement by said pawl.

6. In a calculating machine, the combination with the revolutions counting mechanism, comprising numeral wheels having two series of numbers displaced from each other, of resetting mechanism having a plurality of end or zero positions and comprising a rotary resetting shaft, a sleeve on said shaft providing an end or zero position therefor, a locking pawl having a relatively fixed fulcrum and adapted to lock said sleeve in different end or zero positions, a loose disk on said sleeve, and a coupling pawl having its fulcrum on the disk and adapted to couple the disk and resetting shaft in different relative positions, said pawls being arranged for simultaneous disengagement from the sleeve and disk respectively.

7. In a calculating machine, the combination with the revolutions counting mechanism, comprising numeral wheels having two series of numbers displaced from each other, of resetting mechanism having a plurality of end or zero positions and comprising a rotary resetting shaft, a sleeve on said shaft providing an end or zero position therefor, a locking pawl having a relatively fixed fulcrum and adapted to lock said sleeve in different end or zero positions, a loose disk on said sleeve, a coupling pawl having its fulcrum on the disk and adapted to couple the disk and resetting shaft in different relative positions, said pawls being arranged for simultaneous disengagement from the sleeve and disk respectively, and means to lock said coupling pawl against rotation when being out of locking engagement with the disk.

8. In a calculating machine, the combination with the revolutions counting mechanism, comprising numeral wheels having two series of numbers displaced from each other, of resetting mechanism having a plurality of end or zero positions and comprising a rotary resetting shaft, and its operating member, a sleeve on said shaft providing an end or zero position therefor, a locking pawl having a relatively fixed fulcrum and adapted to lock said sleeve in different end or zero positions, a loose disk on said sleeve, and a coupling pawl having its fulcrum on the disk and adapted to couple the disk and resetting shaft in different relative positions, said pawls being arranged for simultaneous disengagement from the sleeve and disk respectively, and said disk having a notch permitting relative movement of the coupling pawl and disk sufficient to permit turning of the operating member from its end or zero positions without corresponding movement of the disk.

9. In a calculating machine, the combination with the revolutions counting mechanism, the resetting mechanism, and the carrying mechanism comprising pins provided on the numeral wheels, and carrying levers adapted to be rocked by said pins, of an operative connection between said resetting mechanism and carrying levers adapted to rock the carrying levers when starting resetting operation of the resetting mechanism and to permit the levers to return into normal positions prior to the end of the resetting operation, whereby the resetting pins can be shifted from one position relatively to the levers into the other one.

10. In a calculating machine, the combination with the revolutions counting mechanism, comprising numeral wheels having two series of numbers displaced from each other, of resetting mechanism having a plurality of end or zero positions and comprising a rotary resetting shaft, a sleeve on said shaft providing an end or zero position therefor, a locking pawl having a relatively fixed fulcrum and adapted to lock said sleeve in different end or zero positions, a loose disk on said sleeve, a coupling pawl having its fulcrum on the disk and adapted to couple the disk and resetting shaft in different relative positions, said pawls being arranged for simultaneous disengagement from the sleeve and disk respectively, resetting mechanism comprising pins provided on the numeral wheels of the revolutions counting mechanism, carrying levers adapted to be rocked by said pins, and stop members adapted to hold said carrying levers in or out of operative position relatively to the pins, and an operative connection between said disk and stop members adapted when starting the movement of the disk to shift said stop members into position for holding the carrying levers out of operative position relatively to the pins.

In testimony whereof I have hereunto set my hand in presence of two subscribing witnesses.

FRANZ TRINKS.

Witnesses:
 THERESE TRINKS,
 ALFRED FLINDEN.